(12) United States Patent
Nguyen et al.

(10) Patent No.: US 8,724,307 B2
(45) Date of Patent: May 13, 2014

(54) OPTICAL DISK DRIVE WITH REDUCED NOISE

(75) Inventors: Quoc Hoai Nguyen, Round Rock, TX (US); William Barclay, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 601 days.

(21) Appl. No.: 12/566,408

(22) Filed: Sep. 24, 2009

(65) Prior Publication Data

US 2011/0072445 A1 Mar. 24, 2011

(51) Int. Cl.
G06F 1/16 (2006.01)
H05K 5/00 (2006.01)
H05K 7/00 (2006.01)

(52) U.S. Cl.
USPC ....................................... 361/679.33

(58) Field of Classification Search
USPC ........................ 361/679.33–679.45
See application file for complete search history.

(56) References Cited

U.S. PATENT DOCUMENTS

| | | | | |
|---|---|---|---|---|
| 4,712,146 A * | 12/1987 | Moon et al. | ................ | 360/97.18 |
| 5,004,207 A * | 4/1991 | Ishikawa et al. | ............. | 248/632 |
| 5,097,978 A * | 3/1992 | Eckerd | ......................... | 220/315 |
| 5,187,621 A * | 2/1993 | Tacklind | .................... | 360/97.21 |
| 5,223,996 A * | 6/1993 | Read et al. | ................ | 360/99.18 |
| 5,233,491 A * | 8/1993 | Kadonaga et al. | ......... | 360/99.21 |
| 5,394,306 A * | 2/1995 | Koenck et al. | ................ | 361/809 |
| 5,402,308 A * | 3/1995 | Koyanagi et al. | ........ | 361/679.34 |
| 5,510,955 A * | 4/1996 | Taesang | ................... | 361/679.31 |
| 5,535,092 A * | 7/1996 | Bang | ......................... | 361/679.34 |
| 5,546,250 A * | 8/1996 | Diel | ............................ | 360/99.16 |
| 5,583,745 A * | 12/1996 | Uwabo et al. | ............. | 361/679.32 |
| 5,587,855 A * | 12/1996 | Kim | ............................ | 360/99.16 |
| 5,654,874 A * | 8/1997 | Suzuki | .................... | 361/679.32 |
| 5,703,734 A * | 12/1997 | Berberich et al. | ......... | 360/99.18 |
| 5,715,139 A * | 2/1998 | Nakajima | ................ | 361/679.55 |
| 5,788,211 A * | 8/1998 | Astier | .......................... | 248/674 |
| 5,828,547 A * | 10/1998 | Francovich et al. | ..... | 361/679.39 |
| 5,844,772 A * | 12/1998 | Lee et al. | ................. | 361/679.26 |
| 5,975,735 A * | 11/1999 | Schmitt | ............................ | 700/2 |
| 6,034,868 A * | 3/2000 | Paul | ........................ | 361/679.02 |
| 6,052,255 A * | 4/2000 | Kawabe et al. | ............ | 360/97.19 |
| 6,122,165 A * | 9/2000 | Schmitt et al. | ........... | 361/679.31 |
| 6,283,438 B1 * | 9/2001 | Shimada et al. | .............. | 248/694 |
| 6,418,011 B2 * | 7/2002 | Omori | ..................... | 361/679.33 |
| 6,421,236 B1 * | 7/2002 | Montoya et al. | ......... | 361/679.58 |
| 6,631,049 B2 * | 10/2003 | Satoh et al. | ................ | 360/99.22 |
| 6,882,528 B2 * | 4/2005 | Chuang | .................... | 361/679.35 |
| 6,948,176 B2 | 9/2005 | Cho et al. | | |
| 7,106,583 B2 * | 9/2006 | Koh et al. | ................ | 361/679.36 |
| 7,209,195 B2 * | 4/2007 | Lin | ................................ | 349/58 |
| 7,227,743 B2 * | 6/2007 | Lai et al. | .................. | 361/679.33 |

(Continued)

Primary Examiner — Adrian S Wilson
(74) Attorney, Agent, or Firm — Larson Newman, LLP

(57) ABSTRACT

An optical drive includes a drive chassis and a front panel. The drive chassis includes a single sleeve unit having a top panel, a first side panel, a second side panel, a bottom panel, and a back panel. The single sleeve unit is a single piece of material such that the top panel, the first side panel, the second side panel, the bottom panel, and the back panel are continuous. Additionally, the single piece of material is bent at an intersection of each of the top, first side, second side, bottom, and back panels. The front panel is snap fitted onto the top panel, the first side panel, the second side panel, and the bottom panel of the single sleeve unit of the drive chassis.

16 Claims, 5 Drawing Sheets

(56) References Cited

U.S. PATENT DOCUMENTS

| | | | | |
|---|---|---|---|---|
| 7,242,552 B2* | 7/2007 | Kudo et al. | | 360/97.12 |
| 7,251,131 B2* | 7/2007 | Shah et al. | | 361/679.33 |
| 7,342,779 B2* | 3/2008 | Knight | | 361/679.55 |
| 7,372,694 B2* | 5/2008 | Byun et al. | | 361/679.33 |
| 7,420,774 B2* | 9/2008 | Sievers et al. | | 360/97.11 |
| 7,471,509 B1* | 12/2008 | Oliver | | 361/679.33 |
| 7,480,136 B2* | 1/2009 | Lalouette | | 361/679.34 |
| 7,605,999 B1* | 10/2009 | Kung et al. | | 360/99.18 |
| 7,817,373 B2* | 10/2010 | Choi et al. | | 360/97.19 |
| 2001/0015005 A1* | 8/2001 | Chung et al. | | 29/458 |
| 2002/0044416 A1* | 4/2002 | Harmon et al. | | 361/685 |
| 2002/0051338 A1* | 5/2002 | Jiang et al. | | 361/685 |
| 2002/0101713 A1* | 8/2002 | Eland | | 361/686 |
| 2003/0174464 A1* | 9/2003 | Funawatari et al. | | 361/685 |
| 2004/0004928 A1 | 1/2004 | Choi | | |
| 2004/0032711 A1* | 2/2004 | Kaczeus et al. | | 361/685 |
| 2004/0154032 A1 | 8/2004 | Fang | | |
| 2005/0007733 A1* | 1/2005 | Byun et al. | | 361/685 |
| 2005/0023022 A1* | 2/2005 | Kriege et al. | | 174/52.4 |
| 2005/0257949 A1* | 11/2005 | Lalouette | | 174/50 |
| 2006/0073729 A1* | 4/2006 | Guo | | 439/502 |
| 2007/0086105 A1 | 4/2007 | Ng et al. | | |
| 2007/0159786 A1* | 7/2007 | Liu et al. | | 361/685 |
| 2007/0234379 A1 | 10/2007 | Mundt et al. | | |
| 2007/0263351 A1* | 11/2007 | Ho et al. | | 361/685 |
| 2008/0130216 A1* | 6/2008 | Tsai et al. | | 361/685 |
| 2008/0158808 A1* | 7/2008 | Camarena et al. | | 361/685 |
| 2009/0064209 A1 | 3/2009 | Lo et al. | | |
| 2010/0091442 A1* | 4/2010 | Theobald et al. | | 361/679.09 |

* cited by examiner

OPTICAL DISK DRIVE WITH REDUCED NOISE

FIELD OF THE DISCLOSURE

This disclosure relates generally to information handling systems, and more particularly relates to an optical disk drive with reduced noise.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems include optical disk drives, such as compact disk (CD) or digital video disk (DVD) drives. Optical disk drives typically include a drive chassis which houses a drive tray. The drive chassis is typically coupled to a chassis of the information handling system, and the drive tray slides out of the drive chassis to allow a user to change the removable media, such as a CD or a DVD, from the drive tray.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
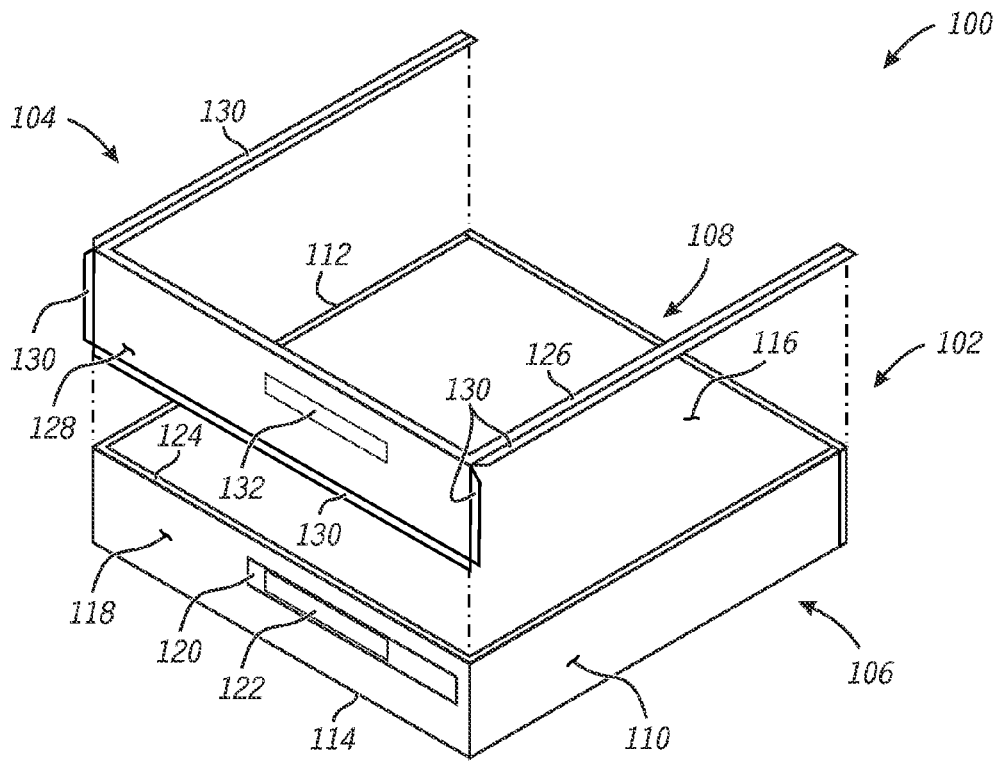
FIGS. 1 and 2 are perspective views of an embodiment of an optical disk drive and a sealing member.
Figure 2:
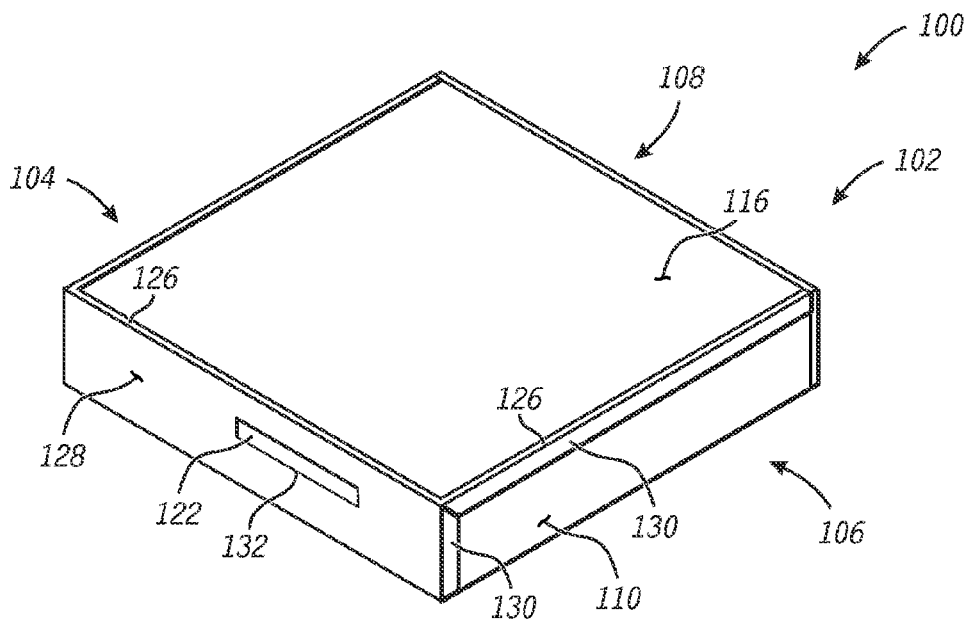

FIGS. 1 and 2 show an optical disk drive system 100, inverted for sake of clarity, of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The optical disk drive system 100 includes a disk drive 102 and a sealing member 104. The disk drive 102 includes a drive chassis 106 and a front panel 108 snap fitted on the drive chassis. The drive chassis 106 includes a first side panel 110, a second side panel 112, a top panel 114, a bottom panel 116, and a rear panel 118. The first side panel 110, the second side panel 112, and the top panel 114 are preferably a single continuous structure that is bent in two locations to form a 'U' shaped cover for the disk drive 102. The two locations that the 'U' shaped cover can be bent are the intersection of the first side panel 110 and the top panel 114, and the intersection of the second side panel 112 and the top panel. The rear panel 118 is preferably connected to the first side panel 110, the second side panel 112, and the top panel 114 by a securing device, such as a screw, a bolt, a rivet, and/or the like. Additionally, the bottom panel 116 is preferably connected to the first side panel 110, the second side panel 112, and the rear panel 118 by one of the securing devices. The connections between the bottom panel 116 and the first side panel 110, the bottom panel and the second side panel 112, and the bottom panel and the rear panel 118 create gaps 124 as found in a conventional optical disk drive.

The rear panel 118 preferably includes an opening 120 that can provide access to different connectors within the disk drive 102, such as a serial advance technology attachment (SATA) connector 122. The SATA connector 122 is preferably positioned in the same location of the disk drive 102 by each disk drive manufacturer. During operation of the disk drive 102, an optical disk can rotate within the disk drive 102 to perform read/write operations, and the rotation of the optical disk can create airborne noise. The airborne noise can be created by air turbulence from the rotation of the optical disk disrupting the air within the disk drive 102. The opening 120 of the rear panel 118, and the gaps 124 can allow the airborne noise to escape from the disk drive 102. Thus, during read/write operations of the optical disk, the disk drive 102 can produce noise that can be heard by the user of the information handling system coupled to the disk drive.

The sealing member 104 includes a first portion 126 and a second portion 128. The first portion 126 preferably is 'U' shaped and can have roughly the same outer dimensions as the bottom panel 116 of the drive chassis 106. The second portion 128 preferably has roughly the same dimensions as the rear panel 118. The first portion 126 and the second portion 128 both include edges or flaps 130 configured to fold over the edges of the disk drive 102. The second portion 128 preferably includes an opening 132 sufficiently large to provide access to the SATA connector 122 when the sealing member is attached to the disk drive 102.

The sealing member 104 can be attached to the disk drive 102 by placing the first portion 126 of the sealing member along the edges of the bottom panel 116 of the disk drive 102 and by placing the second portion 128 on the rear panel 118 as indicated by the dashed lines in FIG. 1. The first portion 126 is configured to completely cover and seal the gaps 124 between the bottom panel 116 and the first side panel 110, the bottom panel and the second side panel 112, and the bottom panel and the back panel 118. The second portion 128 is configured to cover the opening 120 except for the SATA connector 122. When the first portion 126 and the second portion 128 are connected to the disk drive 102, the edges or flaps 130 are folded around the edges of the disk drive to ensure that first and second portions of the sealing member 104 securely cover and seal the gaps 124 as shown in FIG. 2. When the opening 120 and the gaps 124 are covered by the sealing member 104, the airborne noise, generated by the rotation of the optical disk, can be substantially contained within the disk drive 102. Thus, the noise emitted from the disk drive 102 can be lowered by the sealing member 104 covering the opening 120 and the gaps 124 than the noise emitted from the disk drive without the sealing member, as discussed more fully below with respect to FIG. 8.

Figure 3:
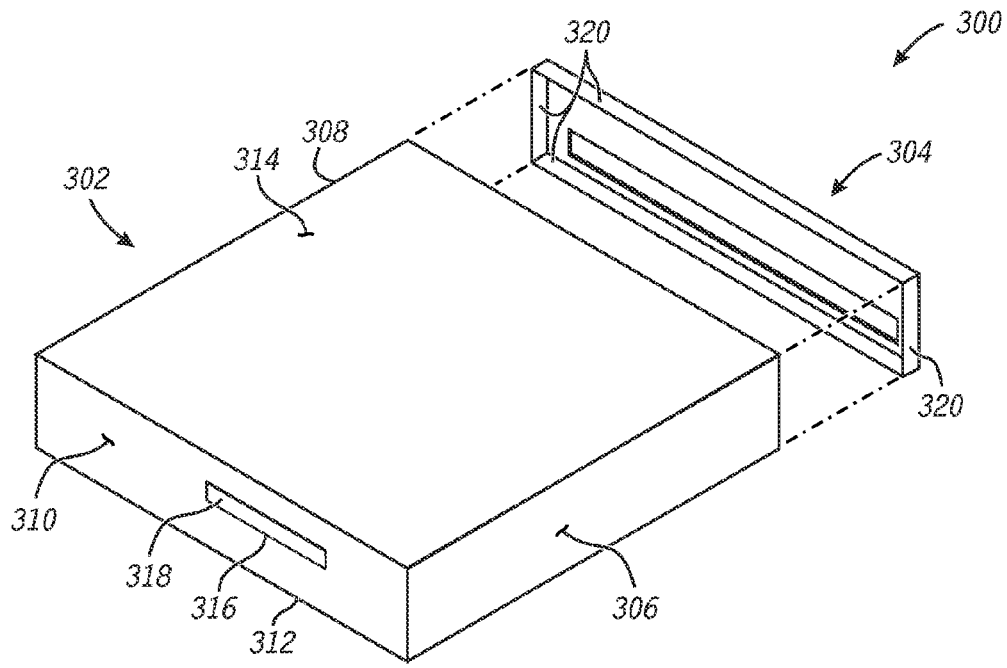
FIG. 3 is a perspective view of another embodiment of the optical disk drive.

FIG. 3 shows an embodiment of an optical drive 300, inverted for sake of clarity, including a single sleeve unit 302 and a front panel 304. The single sleeve unit 302 includes a first side panel 306, a second side panel 308, a rear panel 310, a top panel 312, and a bottom panel 314. The first side panel 306, the second side panel 308, the rear panel 310, the top panel 312, and the bottom panel 314 are preferably molded and/or formed as a single continuous enclosure without any gaps and/or breaks at the intersections of the panels of the single sleeve unit 302. The rear panel 310 preferably includes an opening 316 sufficiently large to provide access to a SATA connector 318 located within the optical drive 300. The front panel 302 includes edges 320. The components of the optical drive 300 can be inserted within the single sleeve unit 302, and then the edges 320 of the front panel 304 can be snap fitted onto the single sleeve unit. The components of the optical drive 300 include an optical disk, a disk head, a disk tray, circuitry for controlling read/write operations of the optical disk, and the like.

Additionally, when the front panel 304 is snap fitted on the single sleeve unit 302, a substantial amount of the airborne noise generated by the rotation of the optical disk can be contained within the optical drive 300. Thus, the noise emitted from the optical drive 300 can be lower with the front panel 304 snap fitted on the single sleeve unit 302 than the noise emitted from a conventional optical drive. The single sleeve unit 302 can differ from the conventional optical drive 102, of FIG. 1, because the conventional optical drive has gaps between the bottom panel 116 and the first side panel 110, the bottom panel and the second side panel 112, and the bottom panel and the rear panel 118, because the single sleeve unit is a continuous enclosure without any gaps and/or breaks.

Figure 4:
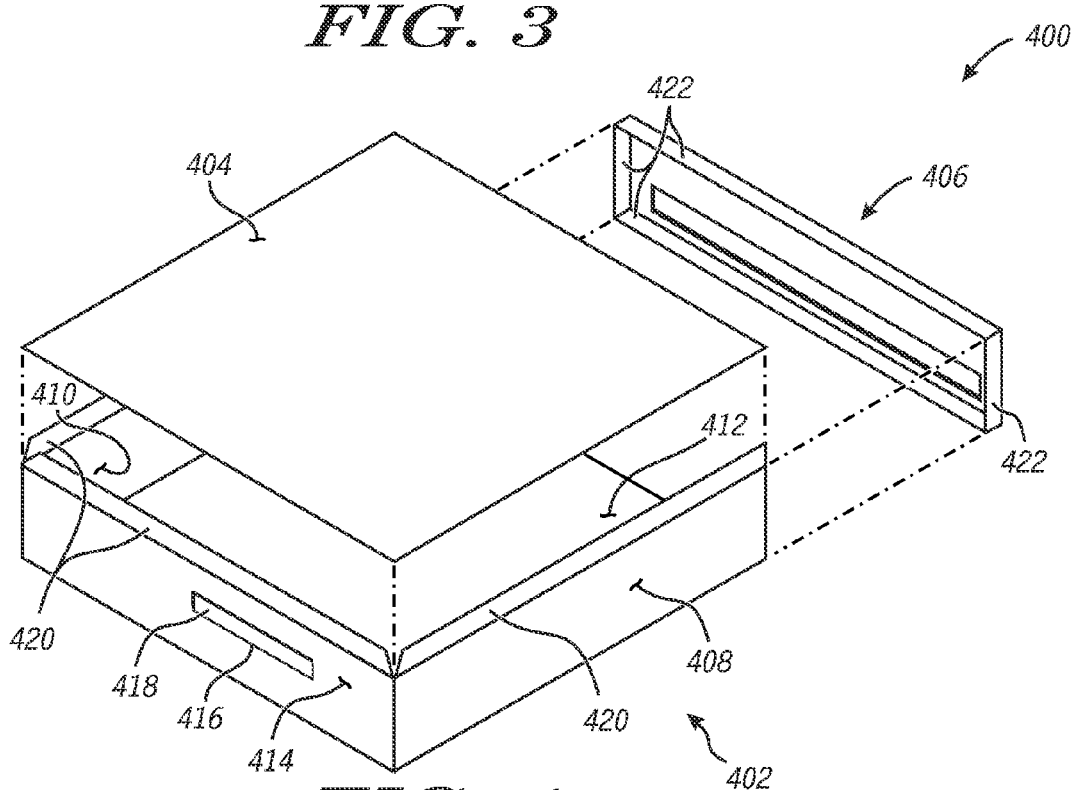
FIGS. 4 and 5 are perspective views of another embodiment of the optical disk drive.
Figure 5:
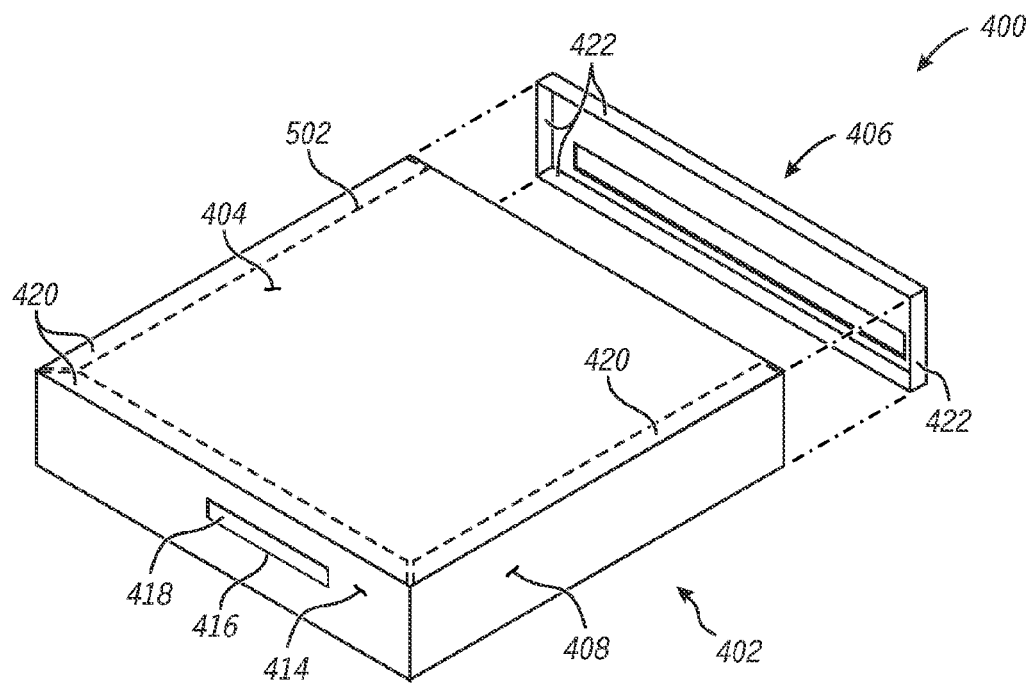

FIGS. 4 and 5 show an embodiment of an optical drive 400, inverted for sake of clarity, including a drive chassis 402, a bottom panel 404, and a front panel 406. The drive chassis 402 includes a first side panel 408, a second side panel 410, a top panel 412, a rear panel 414, and edges 420. The drive chassis 402 can be formed and/or molded, such that the first side panel 408, the second side panel 410, the top panel 412, and the rear panel 414 are one continuous shell without any gaps and/or breaks at the intersections of the panels. The rear panel 414 preferably includes an opening 416 sufficiently large to provide access to a SATA connector 418 located within the disk drive 400.

The disk drive 400 can be constructed by inserting the bottom panel 404 below edges 420 of the drive chassis 402 such that the edges can be bent, crimped, and sealed over the bottom panel 404, as indicated by dashed line 502 in FIG. 5. When the edges 420 are crimped and sealed over the bottom panel 404, the drive chassis 402 can be one continuous enclosure without any gaps and/or breaks at the intersections of the panels. The components of the disk drive 400 can be inserted into the drive chassis 402, and then edges 422 of the front panel 406 can be snap fitted onto the bottom panel 404, the first side panel 408, the second side panel 410, and the top panel 412 such that the optical drive 400 can be completely enclosed without any gaps and/or breaks at the intersections of the panels.

When the edges 422 of the front panel 406 are snap fitted onto the drive chassis 402, the airborne noise generated by the rotation of the optical disk within the optical drive 400 can be substantially contained within the optical drive. Thus, the noise emitted from the optical drive 400 can be substantially lower with the front panel 406 snap fitted onto the crimped and sealed drive chassis 402 than the noise emitted from a conventional optical drive. The crimped and sealed drive chassis 402 can differ from the conventional optical drive 102 because the conventional optical drive has gaps between the bottom panel 116 and the first side panel 110, the bottom panel and the second side panel 112, and the bottom panel and the rear panel 118. The crimped and sealed drive chassis is a continuous enclosure without any gaps and/or breaks.

Figure 6:
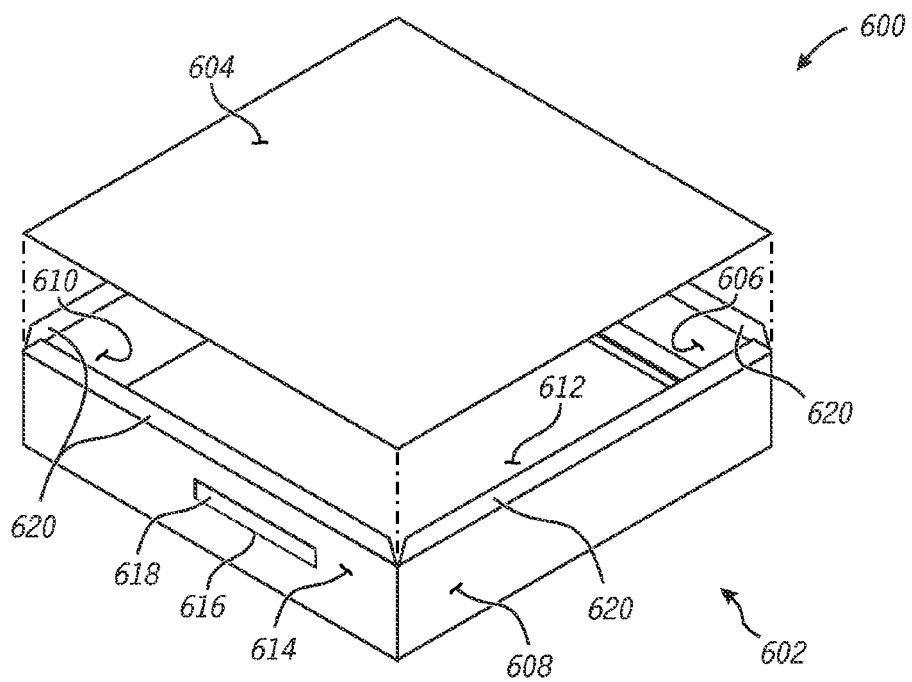
FIGS. 6 and 7 are perspective views of another embodiment of the optical disk drive.
Figure 7:
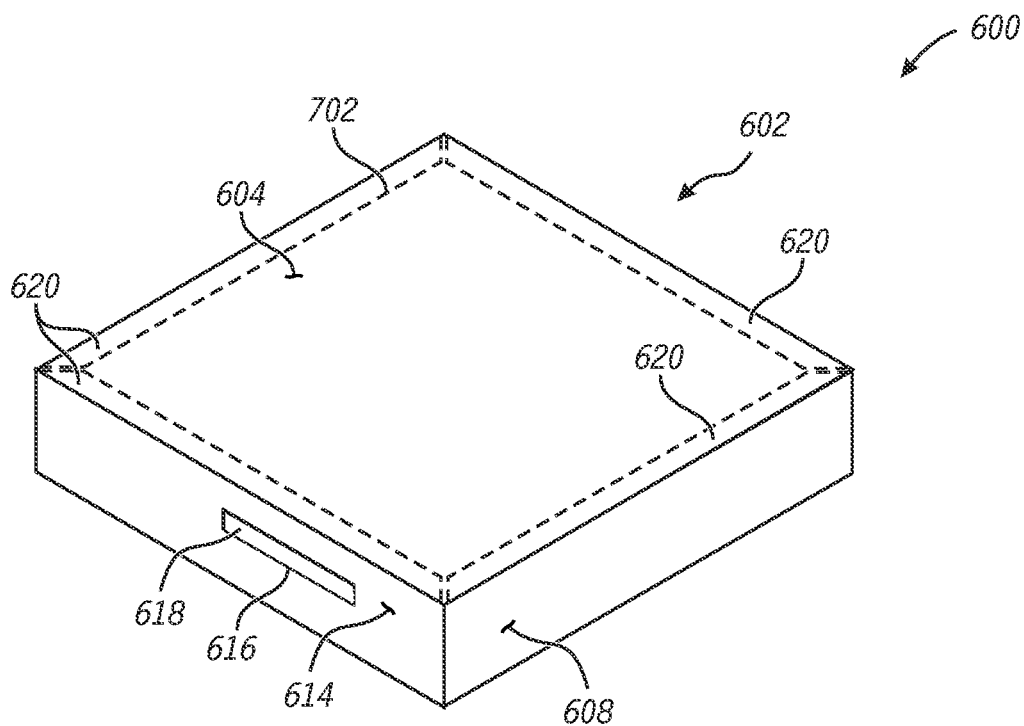

FIGS. 6 and 7 show another embodiment of an optical drive 600, inverted for sake of clarity, including a drive chassis 602 and a bottom panel 604. The drive chassis 602 includes a front panel 606, a first side panel 608, a second side panel 610, a top panel 612, a rear panel 614, and edges 620. The drive chassis 602 can be formed and/or molded, such that the front panel 606, the first side panel 608, the second side panel 610, the top panel 612, and the rear panel 614 form one continuous shell without any gaps and/or breaks at the intersections of the panels. The rear panel 614 can include an opening 616 sufficiently large to provide access to a SATA connector 618 located within the disk drive 600.

The components of the disk drive 600 can be inserted into the drive chassis 602. The disk drive 600 can then be enclosed by inserting the bottom panel 604 below the edges 620 of the drive chassis 602. The edges 620 can be bent, crimped, and sealed over the bottom panel 604, as indicated by dashed line 702 in FIG. 7. When the edges 620 are crimped and sealed over the bottom panel 604, the drive chassis 602 can be one continuous enclosure without any gaps and/or breaks at the intersections of the panels.

Additionally, when the edges 620 are crimped and sealed over the bottom panel 604, the airborne noise generated by the rotation of the optical disk within the optical drive 600 can be substantially contained within the optical drive. Thus, the noise emitted from the optical drive 600 can be substantially lower with the edges 620 being crimped and seal over the bottom panel 604 than the noise emitted from a conventional optical drive. The drive chassis 602 can differ from the conventional optical drive 102 because the conventional optical drive has gaps between the bottom panel 116 and the first side panel 110, the bottom panel and the second side panel 112, and the bottom panel and the rear panel 118. The drive chassis is a continuous enclosure without any gaps and/or breaks.

Figure 8:
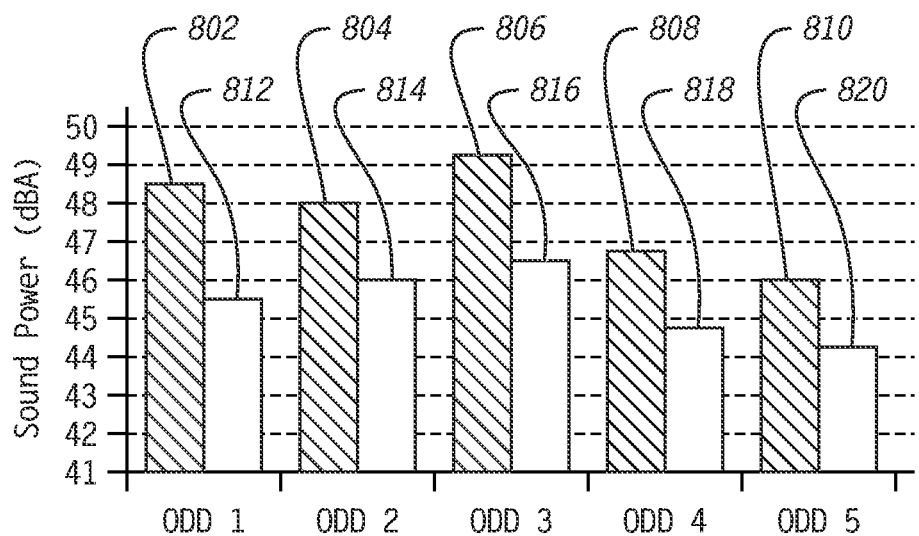
FIG. 8 is a plurality of bar graphs associated with the optical disk drive and the sealing member.

FIG. 8 shows a plurality of bar graphs associated with the optical disk drive system 100 of FIG. 1. The bar graphs indicate measurements of a sound power emitted from five conventional optical disk drives. The sound power can be recorded without a sealing member attached to the optical disk drive, such as in bar graphs 802, 804, 806, 808, and 810, and with the sealing member attached to the optical disk drive, such as in bar graphs 812, 814, 816, 818, and 820.

The sealing member can reduce the sound power emitted by the different conventional optical drives. For example, the first optical disk drive can have an un-sealed sound power 802 of 48.3 "A-weighted" decibels (dBA), and a sealed sound power 812 of 45.3 dBA. An 'A-weighted' decibel is a sound power unit of measurement that is weighted such that the sound power produce within the frequency ranges heard by the human ear is given more weight than the sound power within the frequency ranges outside the range human hearing. The second optical disk drive can have an un-sealed sound power 804 of 48 dBA, and a sealed sound power 814 of 46 dBA. The third optical disk drive can have an un-sealed sound power 806 of 49.1 dBA, and a sealed sound power 816 of 46.5 dBA. The fourth optical disk drive can have an un-sealed sound power 808 of 46.8 dBA, and a sealed sound power 814 of 45.9 dBA. The fourth optical disk drive can have an un-sealed sound power 810 of 46 dBA, and a sealed sound power 820 of 44.1 dBA. Thus, the sealing member can reduce the sound power for a conventional optical disk drive by approximately 2-3 dBA as indicated in FIG. 8. In an embodiment, measurement of the sound power can follow the International Standard for Noise Measurement, such as standard ISO7779 entitled "Measurement of Airborne Noise Emitted by Information Technology and Telecommunications Equipment".

Figure 9:
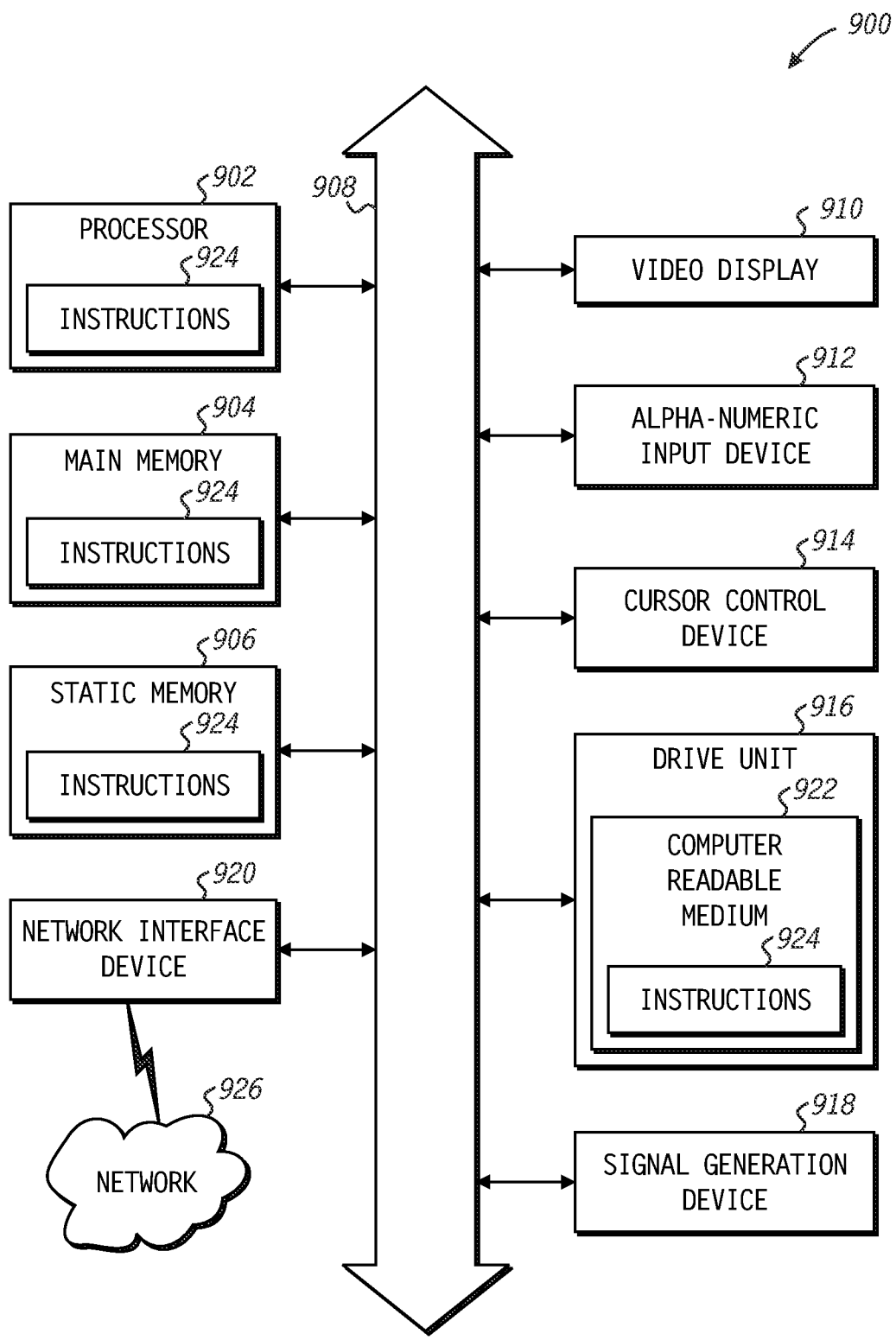
FIG. 9 is a block diagram of a general computer system.

FIG. 9 shows an illustrative embodiment of a general computer system 900 in accordance with at least one embodiment of the present disclosure. The computer system 900 can include a set of instructions that can be executed to cause the computer system to perform any one or more of the methods or computer based functions disclosed herein. The computer system 900 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

The computer system 900 may include a processor 902 such as a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924 such as software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media. The network interface device 920 can provide connectivity to a network 926, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An optical drive comprising:
    a drive chassis including:
        a single sleeve unit having a top panel, a first side panel, a second side panel, a bottom panel, and a back panel, wherein the single sleeve unit is a continuous single piece of material such that the top panel, the first side panel, the second side panel, the bottom panel, and the back panel form the continuous single piece of material, wherein the single piece of material is bent at an intersection of each of the top, first side, second side, bottom, and back panels; and
        a front panel snap fitted onto and around edges of the top panel, the first side panel, the second side panel, and the bottom panel of the single sleeve unit of the drive chassis.

2. The optical drive of claim 1 wherein the back panel provides an information handling system with access to a serial advance technology attachment connector of the optical drive.

3. The optical drive of claim 1 wherein the single sleeve unit and the front panel contain airborne noise within the drive chassis.

4. The optical drive of claim 3 wherein the airborne noise is produced by a rotation of an optical disk within the drive chassis.

5. The optical drive of claim 1 wherein the single sleeve unit receives components to read/write to an optical media.

6. An optical drive comprising:
    a drive chassis including:
        a bottom panel; and
        a top portion having a top panel, a first side panel, a second side panel, a back panel, and a front panel, wherein the top portion is a single piece of material, wherein the single piece of material is bent at an intersection of each of the top, first side, second side, back, and front panels, and a portion of each of the top, first side, second side, back, and front panels are bent over the bottom panel and sealed to the bottom panel to create a complete and continuous enclosure of the drive chassis, wherein the portion of each of the first side, second side, back, and front panels bent over the bottom panel completely cover any gaps or breaks in the top, first side, second side, bottom, and front panels.

7. The optical drive of claim 6 wherein the back panel provides an information handling system with access to a serial advance technology attachment connector of the optical drive.

8. The optical drive of claim 6 wherein the top portion is bent and sealed around the bottom panel to contain airborne noise within the drive chassis.

9. The optical drive of claim 8 wherein the airborne noise is produced by a rotation of an optical disk within the drive chassis.

10. The optical drive of claim 6 wherein components of the optical drive are inserted within the drive chassis prior to the portions of the first side panel, the second side, the front panel, and the back panel being bent and sealed around the edges of the bottom panel.

11. A system comprising:
    an optical drive including:
        a drive chassis having a top cover, a bottom cover, a first side panel, a second side panel, and a rear panel, wherein gaps are located where the first side panel and the bottom panel join, where the rear panel and the top cover join, where the second side panel and the bottom panel join, and where the rear panel and the bottom panel join; and
        a front panel snap fitted onto the cover and the rear panel of the drive chassis; and
        a sealing member adhered to only three edges of the bottom cover of the drive chassis of the optical drive, the sealing member including a first portion to bend from the sealing member and extend and cover the gaps an entire length of where the first side panel and the bottom panel join, a second portion to bend from the sealing member and extend and to cover the gaps an entire length of where the rear panel and the top cover join, and a third portion to bend from the sealing member and extend and to cover the gaps an entire length of where the second side panel and the bottom panel join.

12. The system of claim 11 wherein the sealing member contains airborne noise within the drive chassis.

13. The system of claim 12 wherein the airborne noise is produced by a rotation of an optical disk within the drive chassis.

14. The system of claim 11 wherein the sealing member includes a fourth portion shaped to cover the gaps where the rear panel and the bottom panel join.

15. The system of claim 14 wherein the sealing member includes a fourth portion shaped to cover the rear panel except for a serial advanced technology attachment connector.

16. The system of claim 11 wherein the sealing member is selected from a group consisting of a foam and a tape.

* * * * *